US012789618B2

(12) United States Patent
Wilson et al.

(10) Patent No.: US 12,789,618 B2
(45) Date of Patent: Nov. 10, 2026

(54) MAGNETIC BRACKETS FOR SNORKEL ATTACHMENT TO VEHICLE BODIES

(71) Applicant: Toyota Motor Engineering & Manufacturing North America, Inc., Plano, TX (US)

(72) Inventors: Jakin C. Wilson, Prosper, TX (US); Stephen E. Freeman, McKinney, TX (US)

(73) Assignees: Toyota Motor Engineering & Manufacturing North America, Inc., Plano, TX (US); Toyota Jidosha Kabushiki Kaisha

( * ) Notice: Subject to any disclaimer, the term of this patent is extended or adjusted under 35 U.S.C. 154(b) by 383 days.

(21) Appl. No.: 18/392,445

(22) Filed: Dec. 21, 2023

(65) Prior Publication Data

US 2025/0206130 A1 Jun. 26, 2025

(51) Int. Cl.
*B60K 13/02* (2006.01)
*B60R 11/00* (2006.01)
*B62D 25/04* (2006.01)

(52) U.S. Cl.
CPC .............. *B60K 13/02* (2013.01); *B60R 11/00* (2013.01); *B62D 25/04* (2013.01); *B60R 2011/004* (2013.01); *B60R 2011/0057* (2013.01)

(58) Field of Classification Search
CPC ... B60K 13/02; B60R 11/00; B60R 2011/004; B60R 2011/0057; B62D 25/04
See application file for complete search history.

(56) References Cited

U.S. PATENT DOCUMENTS

| | | | | |
|---|---|---|---|---|
| 10,131,222 | B1 | 11/2018 | Tier et al. | |
| 10,393,076 | B1 * | 8/2019 | Freeman ................ | B60K 13/02 |
| 11,181,083 | B2 * | 11/2021 | Vite Cadena .......... | F02M 35/16 |

FOREIGN PATENT DOCUMENTS

| | | | |
|---|---|---|---|
| CN | 204922236 U | | 12/2015 |
| CN | 207989900 U | | 10/2018 |
| KR | 102175392 B1 | | 11/2020 |
| TW | M310830 U | * | 5/2007 |

OTHER PUBLICATIONS

Mechanical translation of TW-M310830-U, May 1, 2007.*

* cited by examiner

*Primary Examiner* — John D Walters
(74) *Attorney, Agent, or Firm* — Dinsmore & Shohl LLP

(57) ABSTRACT

A vehicle includes a vehicle that includes a pillar that extends in a vehicle vertical direction alongside a window of the vehicle. A snorkel mounting system includes a snorkel mounting bracket including a bracket body with a magnet mounted at an inner face of the bracket body and a clip structure mounted to an opposite, outer face of the bracket body. The magnet is configured to magnetically secure the snorkel mounting bracket to the pillar to hold the snorkel mounting bracket to the pillar and the clip structure is configured to secure a snorkel body to the pillar.

20 Claims, 5 Drawing Sheets

MAGNETIC BRACKETS FOR SNORKEL ATTACHMENT TO VEHICLE BODIES

TECHNICAL FIELD

The present specification generally relates to brackets for mounting vehicle accessories and, more specifically, magnetic brackets for snorkel attachment to vehicle bodies.

BACKGROUND

Some vehicles are configured to drive through water. Some of these vehicles have an internal combustion engine that uses air to combust fuel. Air intakes generally provide the air to cylinders of an engine of the vehicle so that combustion can occur. However, the engine can experience difficulties when the air intake is positioned relatively low on the vehicle permitting water to enter the air intake. To reduce water from entering the combustion engine, a vehicle may have a snorkel attached to the air intake on the combustion engine. The snorkel is a pipe or other tube that connects from the air intake at the engine to a relative higher position on the vehicle to avoid the air intake accepting water when the vehicle is traveling through water. An upper opening of the snorkel can be at a position that is at a roof of the vehicle. In some circumstances, attachment points for the snorkel can involve drilling holes in an A-pillar, which may permit moisture and other contaminates to enter the A-pillar.

SUMMARY

In one embodiment, a vehicle includes a vehicle that includes a pillar that extends in a vehicle vertical direction alongside a window of the vehicle. A snorkel mounting system includes a snorkel mounting bracket including a bracket body with a magnet mounted at an inner face of the bracket body and a clip structure mounted to an opposite, outer face of the bracket body. The magnet is configured to magnetically secure the snorkel mounting bracket to the pillar to hold the snorkel mounting bracket to the pillar and the clip structure is configured to secure a snorkel body to the pillar.

In another embodiment, a snorkel assembly for a vehicle includes a snorkel mounting system that includes a snorkel mounting bracket including a bracket body with a magnet mounted at an inner face of the bracket body and a clip structure mounted to an opposite, outer face of the bracket body. The magnet is configured to magnetically secure the snorkel mounting bracket to a pillar of the vehicle to hold the snorkel mounting bracket to the pillar and the clip structure is configured to secure a snorkel body to the pillar.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles that include snorkel mounting systems for mounting snorkels to pillars of vehicles. The snorkel mounting systems include a snorkel mounting bracket including a bracket body with a magnet mounted on a first face of the bracket body and a clip structure mounted to an opposite, second face of the bracket body. The magnet is configured to magnetically secure the snorkel mounting bracket to the pillar to hold the snorkel mounting bracket to the pillar and the clip structure is configured to secure a snorkel body to the pillar.

Figure 1:
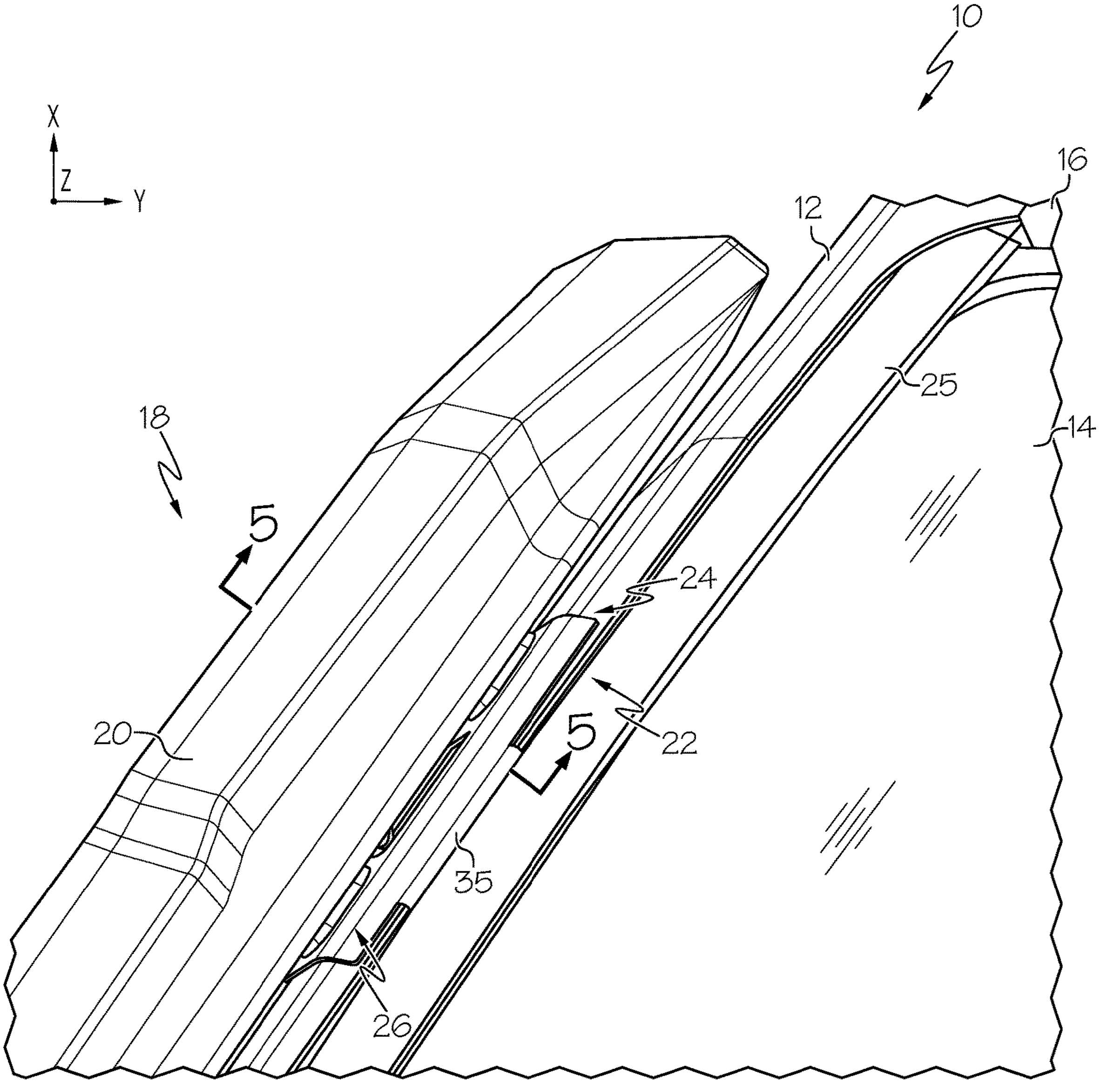
FIG. 1 is a partial view of a vehicle with a snorkel assembly attached thereto using a snorkel mounting bracket, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction of the vehicle (i.e., in the +/− vehicle Y-direction depicted in FIG. 1), and is transverse to the vehicle longitudinal direction. Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Figure 2:
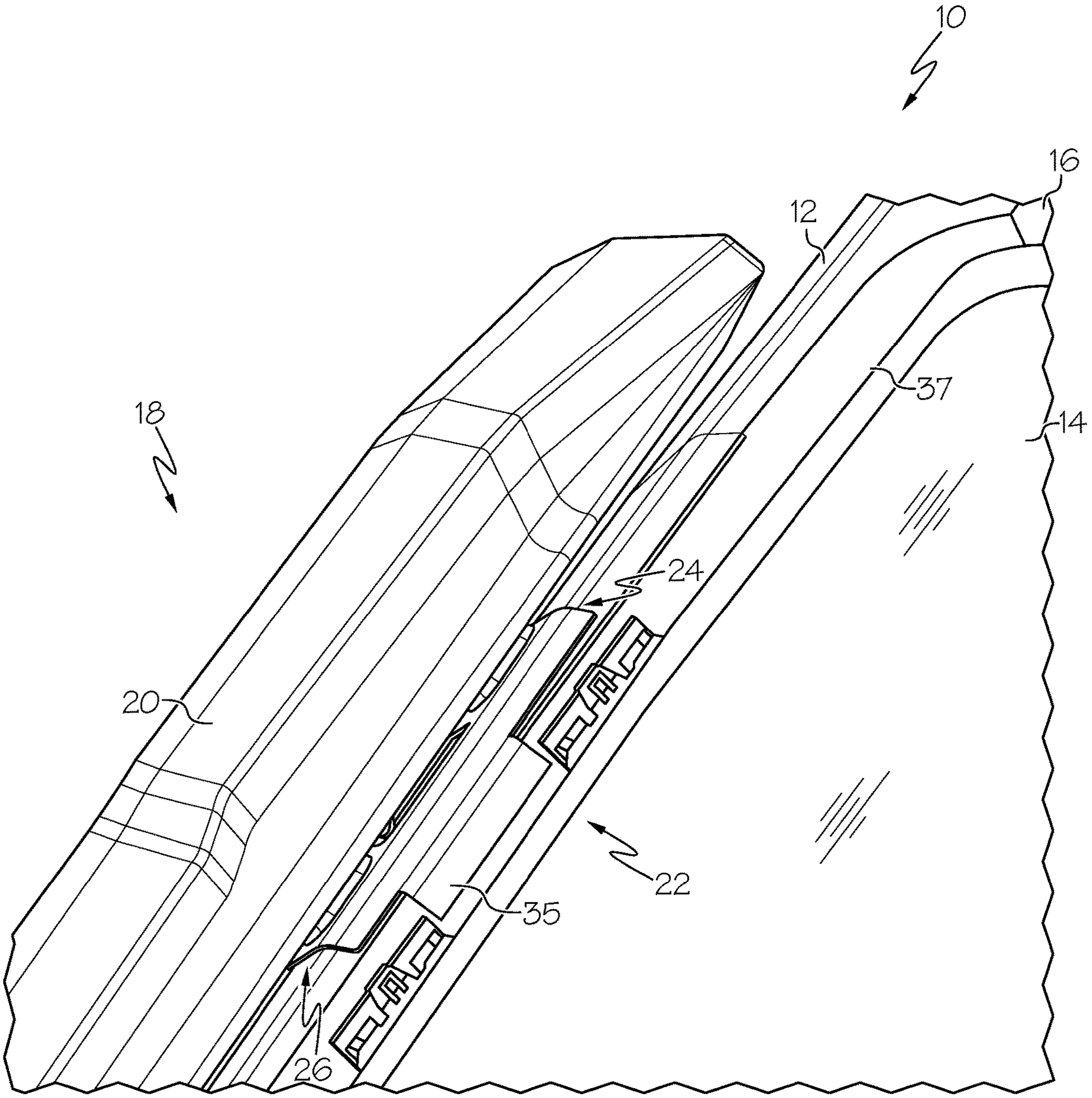
FIG. 2 is a partial view of the vehicle of FIG. 1 with a gutter trim removed, according to one or more embodiments shown and described herein.

Referring to FIGS. 1 and 2, a vehicle 10 includes a pillar 12, in this embodiment, an A-pillar that extends alongside a front window 14 of the vehicle 10 toward a vehicle roof 16. A snorkel assembly 18 includes a tubular snorkel body 20 that extends in the vehicle vertical direction along a length of the pillar 12. As used herein, a "snorkel" in the context of vehicles refers to an air intake mounted above an engine compartment at roof level through which outside air enters and is delivered to an engine of the vehicles, often for use in a combustion process. Snorkels may be used, for example, in crossing bodies of water to place the air intake above the bodies of water.

Figure 3:
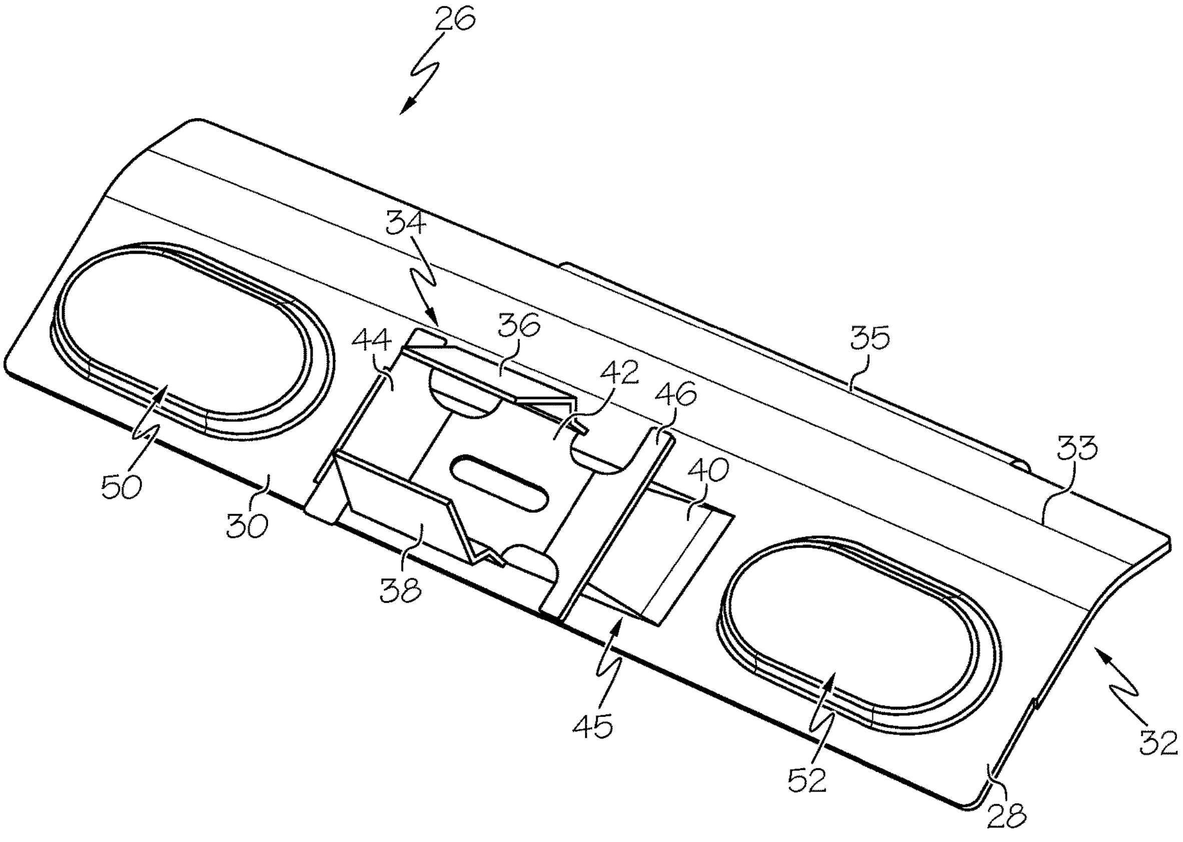
FIG. 3 is a front view of the snorkel mounting bracket of FIG. 1 in isolation, according to one or more embodiments, shown and described herein.
Figure 4:
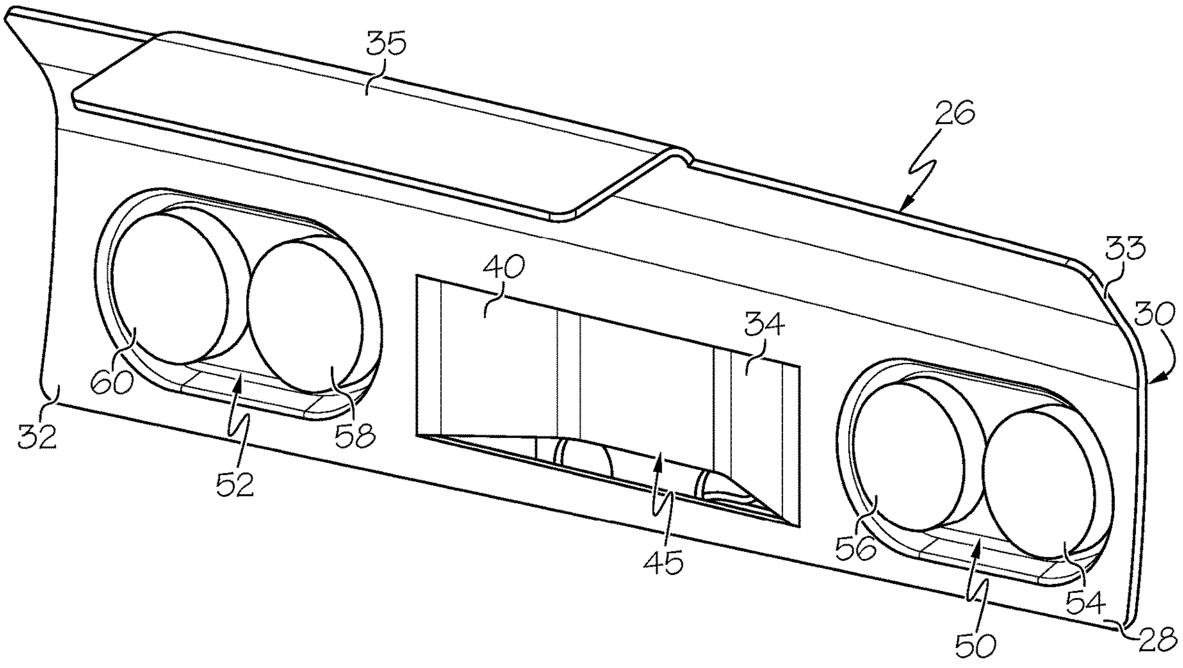
FIG. 4 is a rear view of the snorkel mounting bracket of FIG. 3, according to one or more embodiments shown and described herein.

The snorkel assembly 18 includes a snorkel mounting system 22 that includes a snorkel mounting bracket 24 including a bracket body 26. FIG. 2 illustrates the snorkel mounting system 22 with a vertically-extending gutter trim 25 removed to show more of the bracket body 26 connected to the snorkel body 20. Referring to FIGS. 3 and 4, the bracket body 26 includes an outer portion 28 that is configured to abut the pillar 12. The outer portion 28 has an outer face 30 (FIG. 3) that is configured to face outward away from the pillar 12 and an inner face 32 (FIG. 4) that is configured to face the pillar 12. The outer portion 28 includes a beveled portion 33 having a slope that is configured to match a slope of the pillar 12. An anti-rotation tab 35 may extend rearward from the beveled portion 33 to extend along a side 37 (FIG. 2) of the pillar 12 and inhibit rotation lateral of the snorkel mounting bracket 24 during use. The anti-rotation tab 35 may be configured to extend between slot structures 41 and 43 between the rain gutter trim 25 and pillar 12 of the vehicle 10.

A clip structure 34 extends outward from the outer face 30 that is configured to secure to the snorkel body 20. The bracket body 26 includes a support base 45 that is connected to the outer portion 28. The support base 45 includes first and second protruding portions 39 and 40 that extend outward from the outer portion 28, thereby placing the clip structure 34 in front of the outer face 30. The clip structure 34 includes a clip base 42 connected to the support base 45 of the bracket body 26 and bracket arms 36 and 38 that extend outward from the clip base 42 that are configured to connect to the snorkel body 20. The clip structure 34 may further include spring arms 44 and 46 on opposite sides of the bracket arms 36 and 38 that also extend forward from the clip base 42 and are configured to provide a spring force against the snorkel body 20 outward in the vehicle longitudinal direction when connected to the clip structure 34, which can be used to stabilize the snorkel body 20 during use.

Referring particularly to FIG. 4, the outer portion 28 may include recesses 50 and 52 that extend forward from the inner face 32. The recesses 50 and 52 define pockets on opposite sides of the clip structure 34 that are each configured to receive one or more magnets 54, 56, 58 and 60. The magnets 54, 56, 58 and 60 may each be connected to the bracket body 26 within the recesses 50 and 52, for example, using an adhesive or other suitable bonding process. In some embodiments, magnetic adherence may be used to mount the magnets 54, 56, 58 and 60 within the recesses 50 and 52. In the illustrated example, each recess 50 and 52 includes two magnets 54, 56, 58 and 60; however, in other embodiments, only a single magnet may be used in each recess 50 and 52, or more than two magnets may be used. Further, only a single recess may be used, or more than two recesses may be used, which can be determined, at least in part, on the particular snorkel assembly configuration.

The magnets 54, 56, 58 and 60 may be considered "high powered" in that they may have a relatively high magnetic energy compared to some other magnets, such as a magnetic energy ($BH_{max}$) greater than 60 $KJ/m^3$, such as greater than 200 $KJ/m^3$, such as greater than 400 $KJ/m^3$. As one example, neodymium magnets may be used that can have a strong magnetic adherence to the pillar 12. While the magnets 54, 56, 58 and 60 are illustrated circular in shape, the magnets 54, 56, 58 and 60 may be any suitable shape, such as rectangular, polygonal, irregular, etc.

Figure 5:
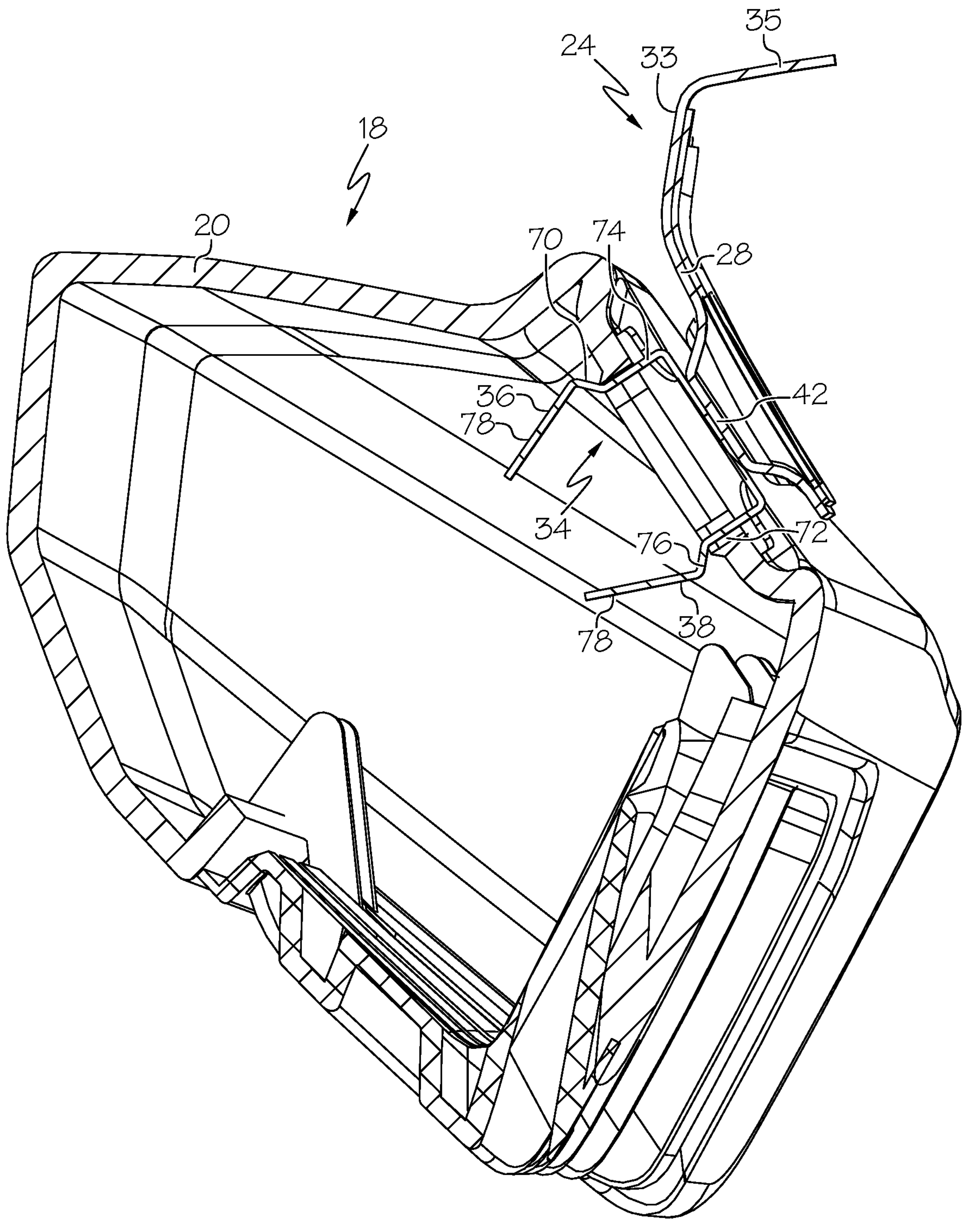
FIG. 5 is a section view of the snorkel assembly along line 5-5 of FIG. 1, according to one or more embodiments shown and described herein.

Referring now to FIG. 5, a section view through line 5-5 of the snorkel assembly 18 is illustrated including the snorkel body 20 and snorkel mounting bracket 24. Ac can be seen, the bracket arms 36 and 38 of the clip structure 34 extend through slots 70 and 72 formed in the snorkel body 20. Each bracket arm 36 and 38 may include a base portion 74 that may extend orthogonally from the clip base 42, an offset portion 76 that extends outward in the vehicle vertical direction oblique to the base portion 74 to overhang the snorkel body 20 adjacent the respective slot 70 and 72 and inhibit unintended removal of the snorkel body 20 from the clip structure 34 and an insertion portion 78 that extends outward from the offset portion 76. As the insertion portions 78 are slid into their slots 70 and 72, the bracket arms 36 and 38 can resiliently bend toward each other until the snorkel body 20 reaches the offset portions 76 when the bracket arms 36 and 38 can snap into their original configurations, providing both an audible and tactile feedback then the snorkel body 20 is installed to the clip structure 34.

The above-described snorkel assemblies with snorkel mounting systems can provide ease in installing and removing the snorkel bodies with an integrated bracket body in structure. An anti-rotation tab may be provided between the windshield rain gutter and pillar to inhibit side-to-side rocking of the snorkel body relative to the pillar. The snorkel assemblies can provide a non-destructive (e.g., no cutting or welding) attachment to the pillar, particularly when the vehicle is not already equipped with snorkel attachment features. The snorkel assemblies can be readily removed for servicing in a repeatable manner. Use of high powered magnets can provide strong magnetic adherence, which can allow the snorkel assembly to be used in car washes, off-road conditions, long term mileage accumulation and any other conditions where a strong magnetic adherence is needed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:

a pillar that extends in a vehicle vertical direction alongside a window of the vehicle; and a snorkel mounting system that includes a snorkel mounting bracket including a bracket body with a magnet mounted at an inner face of the bracket body and a clip structure mounted to an opposite, outer face of the bracket body, the magnet configured to magnetically secure the snorkel mounting bracket to the pillar to hold the snorkel mounting bracket to the pillar and the clip structure configured to secure a snorkel body to the pillar;

wherein the bracket body comprises an outer portion having the inner face that rests facing the pillar and an anti-rotation tab that extends along a side of the pillar.

2. The vehicle of claim 1, wherein the bracket body comprises a beveled portion between the outer portion and the anti-rotation tab.

3. The vehicle of claim 1, wherein the bracket body comprises a recess that defines a pocket, the magnet located in the recess.

4. The vehicle of claim 1, wherein the magnet comprises neodymium.

5. The vehicle of claim 1 further comprising a snorkel body that is configured to connect with the clip structure.

6. The vehicle of claim 5, wherein the clip structure comprises a pair of bracket arms that extend outward from a clip base, the snorkel body having a pair of slots that are configured to receive the pair of bracket arms.

7. The vehicle of claim 6, wherein each bracket arm comprises a base portion that extends outward from the clip base, an insertion portion and an offset portion that connects the insertion portion and the base portion, wherein the offset portion extends oblique to the base portion.

8. A snorkel assembly for a vehicle, the snorkel assembly comprising:

a snorkel mounting system that includes a snorkel mounting bracket including a bracket body with a magnet mounted at an inner face of the bracket body and a clip structure mounted to an opposite, outer face of the bracket body, the magnet configured to magnetically secure the snorkel mounting bracket to a pillar of the vehicle to hold the snorkel mounting bracket to the pillar and the clip structure configured to secure a snorkel body to the pillar;

wherein the bracket body comprises an outer portion having the inner face that rests facing the pillar and an anti-rotation tab that extends along a side of the pillar.

9. The snorkel assembly of claim 8, wherein the bracket body comprises a beveled portion between the outer portion and the anti-rotation tab.

10. The snorkel assembly of claim 8, wherein the bracket body comprises a recess that defines a pocket, the magnet located in the recess.

11. The snorkel assembly of claim 8, wherein the magnet comprises neodymium.

12. The snorkel assembly of claim 8 further comprising a snorkel body that is configured to connect with the clip structure.

13. The snorkel assembly of claim 12, wherein the clip structure comprises a pair of bracket arms that extend outward from a clip base, the snorkel body having a pair of slots that are configured to receive the pair of bracket arms.

14. The snorkel assembly of claim 13, wherein each bracket arm comprises a base portion that extends outward from the clip base, an insertion portion and an offset portion that connects the insertion portion and the base portion, wherein the offset portion extends oblique to the base portion.

15. The snorkel assembly of claim 8, wherein the bracket body comprises two recesses that define pockets, the magnet located in one of the two recesses and another magnet located in the other of the two recesses.

16. The snorkel assembly of claim 15, wherein the one of the two recesses is located on one side of the clip structure and the other of the two recesses is located on an opposite side of the clip structure.

17. A vehicle comprising:

a pillar that extends in a vehicle vertical direction alongside a window of the vehicle;

a snorkel mounting system that includes a snorkel mounting bracket including a bracket body with a magnet mounted at an inner face of the bracket body and a clip structure mounted to an opposite, outer face of the bracket body, the magnet configured to magnetically secure the snorkel mounting bracket to the pillar to hold the snorkel mounting bracket to the pillar and the clip structure configured to secure a snorkel body to the pillar; and a snorkel body that is configured to connect with the clip structure;

wherein the clip structure comprises a pair of bracket arms that extend outward from a clip base, the snorkel body having a pair of slots that are configured to receive the pair of bracket arms.

18. The vehicle of claim 17, wherein the bracket body comprises a recess that defines a pocket, the magnet located in the recess.

19. The vehicle of claim 17, wherein the magnet comprises neodymium.

20. The vehicle of claim 17 further comprising a snorkel body that is configured to connect with the clip structure.

* * * * *